May 22, 1962 — C. R. STOELTING ET AL — 3,035,420
AUGER CONSTRUCTION FOR FROZEN PRODUCTS FREEZER
Filed Aug. 14, 1959 — 2 Sheets-Sheet 1

INVENTORS
CARL R. STOELTING
EDGAR W. DETJEN
BY John W. Michael
ATTORNEY

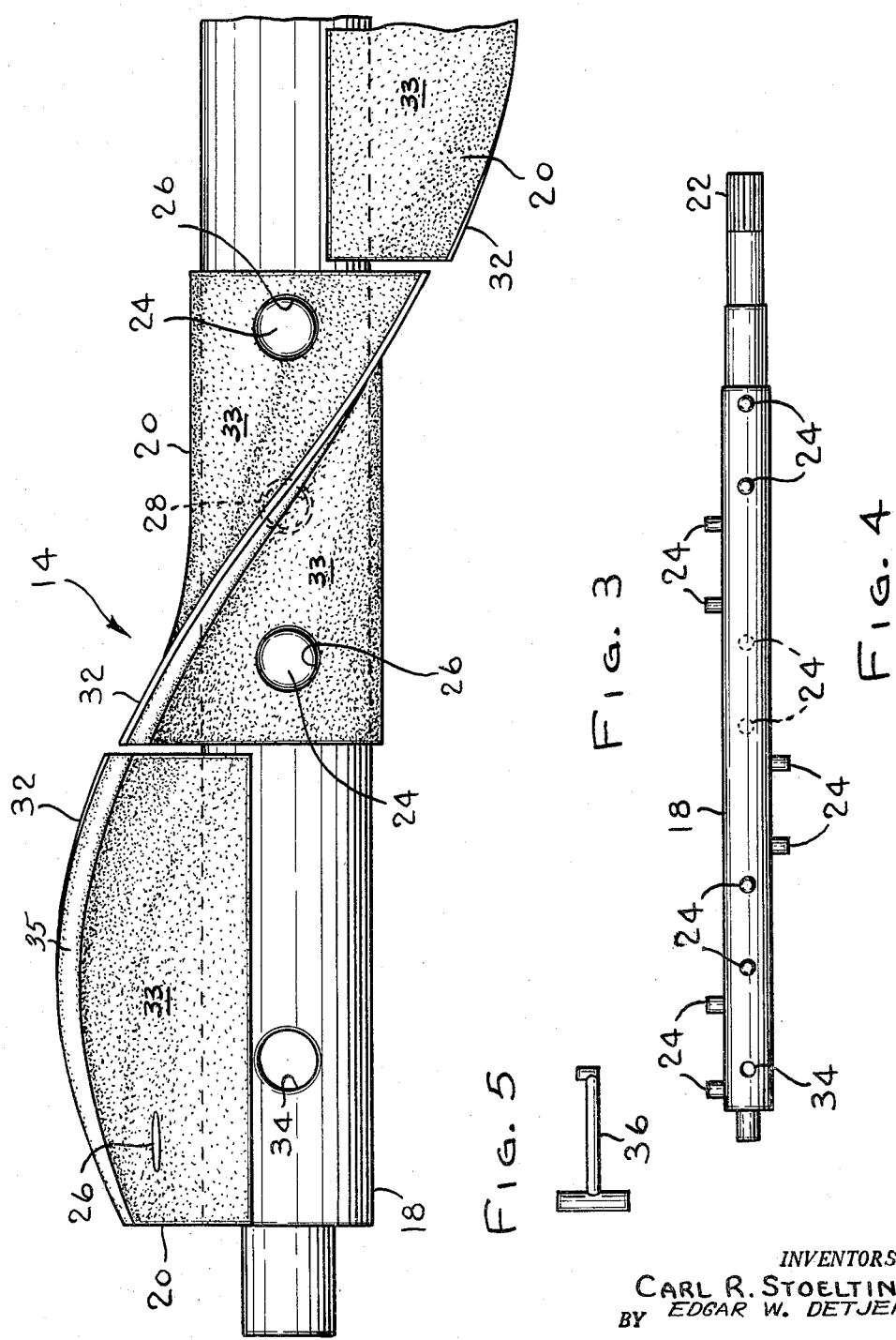

United States Patent Office 3,035,420
Patented May 22, 1962

3,035,420
AUGER CONSTRUCTION FOR FROZEN PRODUCTS FREEZER
Carl R. Stoelting and Edgar W. Detjen, Kiel, Wis., assignors to Stoelting Brothers Company, Kiel, Wis., a corporation of Wisconsin
Filed Aug. 14, 1959, Ser. No. 833,882
2 Claims. (Cl. 62—342)

This invention relates to an improved auger construction for a frozen products freezer.

In prior construction a conventional helical-shaped one-piece auger was utilized with a separate radially mounted wiper blade for scraping the products from the refrigerated cylinder wall of the freezer. With this construction, the frozen product became lodged between the inner edge of the blade and the core of the auger preventing the frozen product from slipping by the blade and mixing with softer product. Several disadvantages resulted. The auger often became clogged preventing movement of the product through the freezer and the unfrozen liquid product was kept from the cylinder wall and therefore not frozen resulting in an inferior product.

The primary object of this invention, therefore, is to provide an auger construction which will thoroughly intermix the soft and frozen product as it is moved through the machine and thereby eliminate the disadvantages of the prior constructions.

Another object of this invention is to provide an auger of simple construction which can be easily removed for cleaning and replacement when necessary.

These objects are attained by an auger comprising a shaft with a plurality of blade segments removably mounted thereon. The blade segments are made with a wiper edge formed integrally therewith along the peripheral edge thereof. The blades curve outwardly from the shaft to the wiper edges in a substantially tangential direction with respect to the shaft. Thus, the liquid mix is continuously forced forwardly through the freezer and outwardly toward the cylinder wall to thereby cause a continuous intermixing of the soft and frozen product as the frozen product is scraped from the wall by the wiper edges on the blades. The blades are undercut adjacent the wiper edge on the leading side thereof to provide an improved scraping action.

Other objects and advantages will be pointed out in, or be apparent from the specification and claims, as will obvious modifications of the single embodiment shown in the drawings, in which:

FIG. 3 is a fragmentary side elevation of an auger embodying my invention;

FIG. 4 is a side elevation of the auger shaft shown in FIG. 3; and

FIG. 5 is a view of a special tool used to remove the auger from the freezer.

Figure 1:
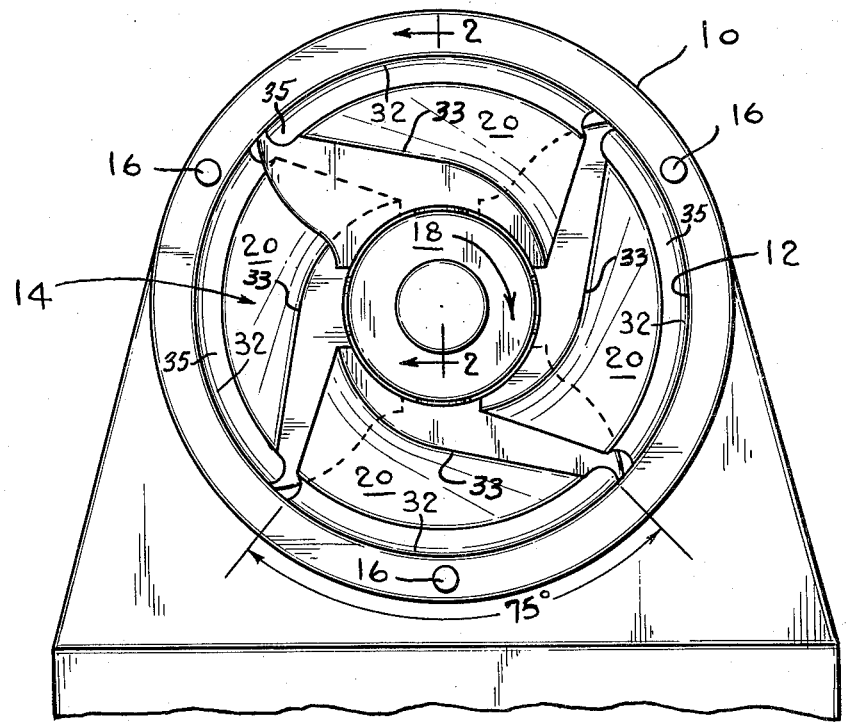
FIG. 1 is a side elevation of a frozen products freezer with the front closure member and dispensing attachment removed.
Figure 2:
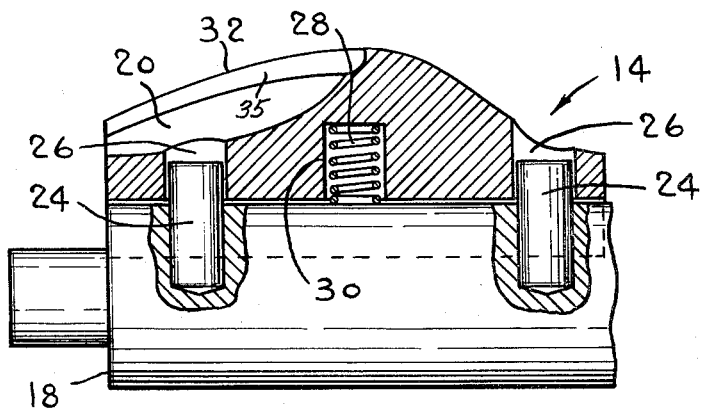
FIG. 2 is a vertical sectional view taken along line 2—2 of FIG. 1.

Referring to the drawings, FIG. 1 shows the front of a frozen product freezer comprising a refrigerated jacket or housing 10 having a cylindrical freezing chamber 12 in which an auger 14 embodying the improved construction of my invention is rotatably mounted. The front closure member and dispensing attachment normally mounted on studs 16 have been removed to expose auger 14.

Auger 14 comprises a shaft 18 on which are mounted a plurality of blade segments 20. Shaft 18 (FIG. 4) which can be made from a piece of commercially available stainless steel bar stock has a splined rear end portion 22 adapted for driven engagement with the auger driving means (not shown) of the freezer.

Blade segments 20 (preferably of nickel alloy) are removably mounted on shaft 18 by pairs of drive pins 24 pressed into drilled holes in the shaft. Pins 24 register with openings 26 in the blades with the blades biased outwardly from shaft 18 into contact with chamber wall 12 by springs 28 mounted in holes 30, as shown. Pairs of pins 24 are spaced longitudinally along shaft 18 with adjacent pairs angularly spaced at 90 degree intervals around the shaft, as shown in FIG. 4. Thus, assembled blade segments 20 and shaft 18 form a helical-shaped auger adapted to move the freezer contents forwardly through the machine as the shaft is rotated in a clockwise direction as viewed in FIG. 1.

As stated previously, the former practice was to use a helical auger (usually one-piece) fitted with a separate wiper blade to scrape the contents from the refrigerated chamber wall 12. This construction has several disadvantages which my invention overcomes.

As shown in FIG. 1, blade segments 20 are made with a wiper edge 32 formed integrally therewith along the peripheral edge thereof. The blades, it is noted, have working surfaces 33 which curve outwardly from shaft 18 to wiper edges 32 in a substantially tangential direction with respect to the shaft (FIG. 1). Thus, the liquid mix introduced at the rear of the machine is continuously forced forwardly and outwardly toward the cylinder wall to thereby cause a continuous intermixing of the soft and frozen product as the frozen product is scraped from the wall by edges 32. The action produces a kneading effect with the product rolling along in front of the blades in the shape of a rope approximately ¾ inch to one inch in diameter. The blades are undercut as at 35 adjacent the wiper edge 32 on the leading side thereof to provide an improved scraping action. This undercut construction insures a clean and thorough scraping of the chamber walls by the blades to thus prevent accumulation of the frozen product thereon.

As previously stated, the pins 24 are angularly spaced at 90 degree intervals around the shaft. As shown in FIG. 1, the blade segments themselves extend an angular distance somewhat less than 90 degrees (about 75 degrees). Thus, the blade surfaces do not form a continuous helical surface from one end of the auger to the other. This stepped or offset arrangement of the blades substantially reduces the likelihood of unfrozen product following along the blades all the way through the freezer during periods of high withdrawal. With this arrangement, even when the rated capacity of the freezer is exceeded, the product may be too soft but not part frozen and part liquid.

It is also noted that the blade segments are longitudinally spaced a small distance (about 7/16 inch) from each other along the shaft. This spacing assures freedom from binding and, in addition, causes rings of frozen product to form on chamber wall 12 between adjacent blades. These rings of frozen product prevent liquid product from moving forward along the chamber wall by diverting such liquid toward the center of the freezer where it becomes mixed with frozen product. The depth of the frozen rings will vary from little or nothing at the warm end of the chamber to about ⅜ inch at the cold end.

A still further advantage of my design is its simplicity of construction and the ease with which it can be removed for cleaning and reinstallation. The individual blade segments can be easily machined and polished with no welds or cast fillets to grind. Shaft 18, as previously stated, can be made from commercial bar stock by simple grinding and drilling operations. To remove the auger for cleaning, a hole 34 is drilled in the front portion of the shaft for engagement by a handle 36 (FIG.

5). The auger can be pulled out in stages and each blade 14 removed separately. Thus, the entire assembly need not be handled at one time making is possible for a woman, for example, to service the freezer who might otherwise, because of the weight, be unable to do so.

Although but one embodiment of the present invention has been illustrated and described, it will be apparent to those skilled in the art that various changes and modifications may be made therein without departing from the spirit of the invention or from the scope of the appended claims.

I claim:

1. An auger for a frozen products freezer comprising, a shaft, a plurality of blade segments mounted on said shaft to form a helical blade, a wiper edge formed integrally with each blade segment along the peripheral edge thereof, said blade segments being undercut adjacent the wiper edge on the leading side of said edge to provide an improved scraping action, said blade segments having working surfaces which extend in substantially tangential directions with respect to said shaft, said wiping edges of said blade segments being longitudinally spaced from each other along the shaft a relatively short distance with respect to the length of said blades to provide a space between adjacent wiping edges to cause rings of frozen product to form on the freezer walls between adjacent wiping edges.

2. A frozen products freezer comprising, a refrigerated housing having a cylindrical chamber, a shaft rotatably mounted in said chamber, a plurality of blade segments mounted on said shaft to form a helical blade, a wiper edge formed integrally with each blade segment along the peripheral edge thereof for contact with the wall of said chamber, said blade segments being undercut adjacent said wiper edge on the leading side of said edge to provide an improved scraping action, said blade segments having working surfaces which extend in substantially tangential directions wth respect to said shaft whereby a liquid mix introduced in one end of said chamber will be forced axially through said chamber and outwardly toward the cylinder wall to cause a continuous intermixing of the product as it is scraped from the cylinder wall by said wiper edges, said wiper edges of said blade segments being longitudinally spaced from each other along the shaft a relatively short distance with respect to the length of said blades to provide a space between adjacent wiper edges to cause rings of frozen product to form on said cylindrical chamber between adjacent wiper edges.

References Cited in the file of this patent

UNITED STATES PATENTS

| | | |
|---|---|---|
| 1,469,896 | Cox | Oct. 9, 1923 |
| 2,023,607 | Miller | Dec. 10, 1935 |
| 2,137,373 | Williams | Nov. 22, 1938 |
| 2,281,944 | Miller | May 5, 1942 |
| 2,282,298 | Vogel | May 5, 1942 |
| 2,402,931 | Thomas | June 25, 1946 |
| 2,576,995 | Carvel | Dec. 4, 1951 |
| 2,610,478 | Lofstedt | Sept. 16, 1952 |
| 2,758,823 | Vashy | Aug. 14, 1956 |

UNITED STATES PATENT OFFICE
CERTIFICATE OF CORRECTION

Patent No. 3,035,420 May 22, 1962

Carl R. Stoelting et al.

It is hereby certified that error appears in the above numbered patent requiring correction and that the said Letters Patent should read as corrected below.

Column 3, lines 17 to 19, strike out "said blade segments being undercut adjacent the wiper edge on the leading side of said edge to provide an improved scraping action,"; column 4, lines 4 to 6, strike out "said blade segments being undercut adjacent said wiper edge on the leading side of said edge to provide an improved scraping action,".

Signed and sealed this 11th day of September 1962.

(SEAL)
Attest:

ERNEST W. SWIDER
Attesting Officer

DAVID L. LADD
Commissioner of Patents